United States Patent
Christy

(10) Patent No.: US 10,131,739 B1
(45) Date of Patent: Nov. 20, 2018

(54) POLYMERIZABLE COMPOSITION, METHOD, AND STRUCTURAL MATERIALS PRODUCED THEREFROM

(71) Applicant: Jack D. Christy, Fishers, IN (US)

(72) Inventor: Alexander Christy

(73) Assignee: Jack D. Christy, Carmel, IN (US)

( * ) Notice: Subject to any disclaimer, the term of this patent is extended or adjusted under 35 U.S.C. 154(b) by 0 days.

(21) Appl. No.: 14/307,318

(22) Filed: Jun. 17, 2014

Related U.S. Application Data

(60) Provisional application No. 61/835,805, filed on Jun. 17, 2013.

(51) Int. Cl.
| | | |
|---|---|---|
| C08G 18/00 | (2006.01) |
| C08G 18/48 | (2006.01) |
| C08G 18/76 | (2006.01) |
| C08G 18/34 | (2006.01) |
| C08G 18/24 | (2006.01) |
| C08G 18/18 | (2006.01) |
| C08K 7/14 | (2006.01) |
| C08K 3/36 | (2006.01) |
| C08K 7/06 | (2006.01) |

(52) U.S. Cl.
CPC ..... *C08G 18/4887* (2013.01); *C08G 18/1825* (2013.01); *C08G 18/242* (2013.01); *C08G 18/34* (2013.01); *C08G 18/341* (2013.01); *C08G 18/7664* (2013.01); *C08G 18/7671* (2013.01); *C08K 3/36* (2013.01); *C08K 7/06* (2013.01); *C08K 7/14* (2013.01)

(58) Field of Classification Search
CPC .. C08G 18/4887; C08G 18/34; C08G 18/242; C08G 18/7664; C08G 18/341; C08G 18/7671; C08G 18/1825; C08K 7/14; C08K 7/06; C08K 3/36
See application file for complete search history.

(56) References Cited

U.S. PATENT DOCUMENTS

| | | | | |
|---|---|---|---|---|
| 3,715,337 | A * | 2/1973 | Allen | C08G 18/022 252/192 |
| 4,169,922 | A * | 10/1979 | Brown | C08J 9/0023 521/107 |
| 4,301,270 | A * | 11/1981 | Chang | C08G 18/10 252/182.17 |
| 4,482,690 | A * | 11/1984 | Orphanides | C08G 18/10 528/64 |
| 2004/0094859 | A1* | 5/2004 | Cheolas | B29C 33/60 264/136 |
| 2005/0173830 | A1* | 8/2005 | Thiele | C04B 26/16 264/240 |
| 2011/0086933 | A1* | 4/2011 | Herrington | C04B 26/16 521/170 |
| 2012/0189838 | A1* | 7/2012 | Pellacani | B32B 5/20 428/314.4 |

FOREIGN PATENT DOCUMENTS

WO  WO-2008092597  *  8/2008

OTHER PUBLICATIONS

Pot Life, Working Life and Gel Time of Epoxies, http://www.epotek.com/site/files/Techtips/pdfs/techtips_26_7.pdf, downloaded Dec. 17, 2015.
Mixing Instructions for Urethane Adhesives and Elastomers, https://www.star-technology.com/sites/default/files/web-files/ur-shipments.pdf?570, downloaded Dec. 17, 2015.
Compression Molding Process, http://www.moldedfiberglass.com/processes/processes/closed-molding-processes/compression-molding-process, downloaded Dec. 17, 2015.
Pot Life, https://www.corrosionpedia.com/definition/917/pot-life, downloaded Dec. 17, 2015.
Daniels, Farrington, Alberty, Robert A., Physical Chemistry, Apr. 1963, pp. 314-315, John Wiley & Sons, Inc.

* cited by examiner

*Primary Examiner* — Michael L Leonard
(74) *Attorney, Agent, or Firm* — Edward E. Sowers; C. John Brannon; Brannon Sowers & Cracraft PC

(57) ABSTRACT

A polymerizable formulation is provided, and a method for polymerizing the formulation under pressure to provide a polyurethane structural material having wood-like properties and additionally being resistant to insects, waterproof, and self-extinguishing when exposed to a flame.

19 Claims, No Drawings

POLYMERIZABLE COMPOSITION, METHOD, AND STRUCTURAL MATERIALS PRODUCED THEREFROM

CROSS-REFERENCE TO RELATED APPLICATIONS

This application claims the benefit of U.S. Provisional Application No. 61/835,805, filed Jun. 17, 2013, and incorporates all by reference herein, in its entirety.

TECHNICAL FIELD

The novel technology relates generally to the field of chemistry and, specifically, to a formulation for a quick setting polymer and structures produced from the formulation.

Construction techniques have developed around the use of wood and wood-derived materials. Attachments are commonly made with nails, screws, staples, glue and the like. Wood and wood related materials suffer from the potential of moisture, attack by insects and microorganisms, and destruction by fire. What is needed is a structural material having the general properties of a wood-based structural material, thus allowing for the use of conventional construction techniques, but that also provides protection against damage caused by water, fire, insect, and microorganisms. The present disclosure addresses these needs.

SUMMARY

The present invention relates to a chemical formulation, system and method for producing quick set solid polymer bodies. One object of the present invention is to provide an improved polymeric formulation for the production of structural materials which can be formed on site. Related objects and advantages of the present invention will be apparent from the following description.

A first aspect of the present disclosure involves a polymerizable formulation that includes at least one isocyanate, at least one polyol, a catalyst and at least one filler contained in a mold having a pressure rating of at least 600 psi. For some formulations, a mold having a pressure rating of at least 2000 psi is required, and for other formulations, a mold having a pressure rating of at least 3000 psi is required. Suitable isocyanates include, but are not limited to polymethylene polyphenylisocyanate, diphenylmethane diisocyanate, triphenylmethane triisocyanate, toluene diisocyanate and methyl diisocyanate (MDI), and combinations thereof. Suitable fillers include, but are not limited to glass fibers, carbon fibers, plant fibers, carbon particles, polyolefins (such as polypropylene), polyamides (such as nylon and aramids) and sand. Other optional components include, but are not limited to a vegetable oil, a polyphenol, an antioxidant, a surfactant, a colorant, an ester, and a blowing agent. Preferred polymerization catalysts include, but are not limited to tertiary amines, tin derivatives such as dibutyltin dilaurate stannous octoate, and dibutyltin diacetate, and tributyl bismuth.

The formulations described above typically have a pot life after the components are mixed of about 1 to 15 minutes, preferably about 2 to 10 minutes, and more preferably about 3 to 8 minutes, before the formulation begins to expand and generate heat.

A preferred polymerizable formulation includes 4,4-diphenylmethane diisocyanate (MDI), polymethylene polyphenyl isocyanate, a polyester polyol, diethylene glycol, soy oil, fiber glass, and a catalyst. Suitable catalysts include dilauryltin dilaurate, triphenyl bismuth, and combinations thereof.

Another preferred polymerizable formulation includes diphenylmethane diisocyanate, polymethylene polyphenyl isocyanate, a poly resin system, a tertiary amine catalyst, a polyester polyol, dibutyltin dilaurate, or tributyl bismuth, or combinations thereof, corn oil, fiber glass (¾ inch fibers), and $SiO_2$ natural sand.

Suitable tertiary amine catalysts were found to be trimethylhexamethylenediamine, tetramethylbutanediamine, and hydroxypropylethylene-diamine.

Another preferred polymerizable formulation includes methylene bis(phenylisocyanate) or MDI, polymethylene polyphenylisocyanate, a polyol resin, a tertiary amine catalyst, a mixture of 8 alkyl phthalates, chopped fiber glass, $SiO_2$ natural sand, and a powdered brown colorant.

Another preferred polymerizable formulation includes methylene bis(phenylisocyanate) or MDI, polymethylene polyphenyl isocyanate, a polyol blend, a tertiary amine catalyst, soy oil, fiber glass and carbon fibers. Suitable tertiary amine catalysts were found to be trimethylhexamethylenediamine, tetramethylbutanediamine, and 2-hydroxypropylethylene-diamine.

Another preferred polymerizable formulation includes polymethylene polyphenyl isocyanate, butyl benzyl phthalate, a polyether polyol, dibutyltin dilaurate soy oil, fiber glass and an oil-based colorant.

Additionally, without offering an explanation for the effect, a benefit has been realized with the addition of components such as butadiene monomer, neoprene, and other synthetic elastomers to the formulations described above. Structural materials produced with the inclusion of these components have been found to provide improved physical, mechanical and chemical properties, as well as improved resiliency upon impact when these components are included in a polymerizable formulation.

A further aspect of the present disclosure involves a method for forming a structural material utilizing a polymerizable formulation including at least one isocyanate precursor selected from the group consisting of polymethylene polyphenylisocyanate, diphenylmethane diisocyanate, triphenylmethane triisocyanate, toluene diisocyanate, and methyl diisocyanate (MDI), at least one polyol, a catalyst, a vegetable oil, at least one filler contained in a mold having a pressure rating of at least 600 psi, sealing the mold within about 1 to 10 minutes after providing, and polymerizing the formulation in an exothermic and substantially adiabatic manner until the polymerization is essentially complete as evidenced by no further generation of heat. For certain polymerizable formulations, the polymerization, is essentially complete within about 5 to 30 minutes. For other formulations, the polymerization is complete within about 7 to 25 minutes. For still other formulations, the polymerization is complete in about 9 to 20 minutes. Pressure generated during the polymerizations typically range from about 600 to 3000 psi, more typically from about 800 to 2200 psi. The methods disclosed herein can be utilized to form structural materials from any of the polymerizable formulations discussed above with minimal alteration in the process.

A further aspect of the current disclosure involves a structural material molded to an intended shape. The structural material is consists of a closed cell polyurethane exhibiting at certain properties associated with wood. Properties exhibited include the ability to be sawed, nailed, stapled, sanded, glued, and painted. In addition, the structural material is waterproof, resistant to insects, and is self-extinguishing when exposed to a flame. Structural materials, according to this disclosure can be prepared from the processes described above, utilizing the polymerizable formulations described above with minimal variation.

DESCRIPTION OF THE PREFERRED EMBODIMENTS

For the purposes of promoting an understanding of the principles of the invention and presenting its currently understood best mode of operation, reference will now be made to the embodiments illustrated in the drawings and specific language will be used to describe the same. It will nevertheless be understood that no limitation of the scope of the invention is thereby intended, with such alterations and further modifications in the illustrated device and such further applications of the principles of the invention as illustrated therein being contemplated as would normally occur to one skilled in the art to which the invention relates.

For the purpose of assisting with the understanding of the present disclosure, the following definitions are provided:

Isocyanate precursor refers to isocyanate derivatives having two, or more isocyanate groups attached thereto.

Plant fibers refer to fibers derived from a plant material.

A vegetable oil refers to an oil derived from a plant source, or a synthetic mixture simulating a vegetable oil.

Pot life refers to a time between mixing a formulation's components and an expansion of the formulation's volume beyond the mold's volume.

Elastomer refers to components such as for example, butadiene monomer, neoprene, and other synthetic elastomers A first embodiment of the present novel technology relates to a formulation capable of rapidly polymerizing on site without the application of heat to provide structural materials lighter than wood, but capable of being processed and worked like wood. Formulations typically include a polymeric isocyanate, a monomeric diisocyante, or mixtures thereof, a polyol, a catalyst, and one or more filler materials. Formulations can optionally contain fatty acids, fatty acid esters, polyphenols, polyphenolic epoxides, antioxidants (such a hydroxylamine), surfactants, blowing agents, colorants, flame retardants, and plasticizers. Suitable polymeric isocyanates can be provided in their polymeric form or formed in situ, and include polymethylene polyphenylisocyanate, diphenylmethane diisocyanate, triphenylmethane triisocyanate, toluene diisocyanate, and methyl diisocyanate. Preferred isocyanates include the polymeric isocyanate polymethylene polyphenylisocyanate, and the monomeric diisocyanate MDI. Preferred amounts of the polymeric isocyanate (or its monomeric precursor) include from about 20-50 wt. %, more preferably from about 25-45 wt. %, and most preferably from about 30-40 wt. %. Certain polyols include polyolethers and polyesters derived from sucrose, sorbitol, and/or glycerol. Other polyols include polyether polyols, which are ethylene oxide adducts of polyoxypropylene triol. Preferred amounts of the polyol include from about 15-50 wt. %, more preferably from about 20-45 wt. %, and most preferably from about 25-40 wt. %. Suitable catalysts include, but are not limited to, amines such as trimethylhexamethylenediamine, tetramethylbutanediamine, triethylenediamine, and 2-hydroxypropylethylenediamine, and dialkyl tin derivatives. Preferred amounts of an amine catalyst include from about 3-8 wt. %, more preferably from about 4-7 wt. %, and most preferably from about 5-6 wt. %. Fatty acid and fatty acid esters can be provided by vegetable oil components such as soy oil, olive oil, corn oil and the like. Preferred amounts of a vegetable oil containing fatty acids and fatty acid esters include from about 0.1-10 wt. %, more preferably from about 1-7 wt. %, and most preferably from about 2-6 wt. %. Filler materials can include fiber glass, carbon fiber, sand, and other fiber materials including cellulose and other plant derived fibers. However, the inclusion of cellulose fibers is not required in order to provide the wood-like properties. Preferred amounts of filler materials include from about 1-45 wt. %, more preferably from about 2-40 wt. %, and most preferably from about 5-35 wt. %.

Suitable polyphenols include 4,4'-isopropylidenediphenol and the like. Suitable surfactants can include polalkylene polysiloxane, dimethyl silicone polymer, and the like. Examples of blowing agents capable of producing a closed cell structure include, but are not limited to, water, fluorocarbons, such as trichloromonofluoromethane, methylene chloride, and the like. Ester such as butyl benzyl phthalate, other phthalate esters and the like can similarly be included to reduce water vapor permeability, reduce cell volume, and increase the number of closed cells.

Polymerizable formulations according to this disclosure can also include polyphenolic epoxides, such as for example the adduct of 4,4'-(1 Methylethylidene) bisphenol polymer with (chloromethyl)oxirane or the components utilized to prepare the adduct.

The formulations described herein can be formed at ambient temperatures and handled for about 30-60 seconds before polymerization initiates, and further handled for 1-10 minutes before sealing the mold. Cooling the components prior to and during mixing can lengthen the formulation's pot life. Polymerization of the formulation, once initiated, is exothermic, proceeds under substantially adiabatic conditions and is complete within minutes.

A further embodiment includes the method utilized to polymerize the novel formulations in order to provide the important structural material having advantageous properties. The formulation's components including filler material(s) can be combined and mixed in a serial manner outside of the mold or added directly to the mold with mixing therein. Filler materials can also be added directly to the mold and subsequently combined and mixed with the formulation's other components added to the mold. The mold utilized should be capable of maintaining elevated pressures such as at least about 600 psi and more preferably at least about 800 to 2200 psi. Once the mixed components have all been added to the mold, the mold is closed and secured against the build-up of pressure. This is typically accomplished through the use of clamping devices or hydraulic systems. Components are added at ambient temperature or can be cooled before combining to delay polymerization, if necessary, for sufficient time to fill and secure the mold. Once the components are combined, mixed, and secured within the mold, polymerization initiates in an exothermic and substantially adiabatic manner causing the polymerization mixture to reach temperatures in the range of about 38 to 77° C., or more preferably within the range of from about 43 to 71° C., and still more preferably within the range of from about 49 to 66° C., and pressures ranging from about 600 to 2200 psi, more preferably from about 700 to 2100, and still more preferably from about 800 to 2000 psi. Polymerization is completed within about 5 to 35 minutes, more preferably within about 10 to 25 minutes, still more preferably within about 15 to 20 minutes. Upon cooling the newly formed structural material can be removed from the mold and utilized for its intended purpose.

A still further embodiment includes a structural material, molded to a desired shape and comprising a closed foam polyurethane containing a filler that exhibits several properties generally associated with wood. For example, the structural material can be sawed, accept and retain nails, screws, and staples, is waterproof, resists insect damage, can be sanded, glued and painted, and is self-extinguishing when exposed to a flame. Flame retardant qualities can be further improved by the addition of flame retardants such as tricresyl phosphate. Examples of items constructed from the structural material include, but are not limited to, board replacements for use in flooring, siding, roofing, stairs, railings, trusses, pallets, carts, containers, water vessels, docks, pre-fabricated emergency housing, panels for semi-trailers and RV's, auto and truck components, acoustical barriers, highway railing & bumpers, and the like; structural elements for framing such as 2×4's, a wall panel; and fencing and deco trim. As can be recognized from the above listing, the structural material can also advantageously replace some metal articles, and be substituted for other plastic articles. Structural materials can also be mixed polymers such as polyurethanes/epoxides.

Example 1

4,4'-Diphenylmethane diisocyanate (190 g), MDI mixed isomers (110 g), polymethylene polyphenylisocyanate (100 g), a polyester polyol containing about 3 g of dibutyltin dilaurate (36 g), diethylene glycol (8 g), soy oil (20 g), fiber glass (¾ inch fibers) (150 g) were serially placed in a 6'×18"×1" mold containing fiber glass (10"/12" knotted fibers) (30 g), the contents of the mold mixed, the mold was closed and clamped to withstand a pressure build-up, and the mixture allowed to polymerize under ambient conditions. Within about 15 minutes the temperature rose to about 132° F., and produced an internal pressure of about 1800 psi. Upon removal from the mold, the structural material exhibited strength comparable to wood, was waterproof, and could be nailed, sawed, screwed, and sanded. The resulting structural material was suitable for use as board flooring, siding, and roofing.

Example 2

Diphenylmethane diisocyante (67.5 g), polymethylene polyphenyl isocyanate (67.5 g), a poly resin system containing about 1 wt. % of a tertiary amine catalyst (125 g), a polyester polyol (polyoxyalkylene) containing about 1.5 g of dibutyltin dilaurate (triphenyl bismuth or mixtures of dibutyltin dilaurate and triphenyl bismuth could also be utilized), (20 g), corn oil (20 g), fiber glass (¾ inch fibers) (30 g), and $SiO_2$ natural sand (30 g) were serially placed in a 2"×4"×12" mold, the contents of the mold mixed, the mold was closed and clamped to withstand a pressure build-up within the mold, and the mixture allowed to polymerize under ambient conditions. Within about 15 minutes the temperature rose to about 145° F., and produced an internal pressure of about 1200 psi. Upon removal from the mold, the structural material exhibited strength comparable to wood, was waterproof, and could be nailed, sawed, screwed, and sanded. The resulting structural material was suitable for use as a framing material.

Example 3

Methylene bis(phenylisocyanate) or MDI (65 g), polymethylene polyphenylisocyanate (65 g), a polyol resin containing about 0.5 to 1 wt. % of a tertiary amine catalyst selected from the group consisting of trimethylhexamethylenediamine, tetramethylbutanediamine, and 2-hydroxypropylethylene-diamine (130 g), a mixture of 8 alkyl phthalates (10 g), chopped fiber glass (½" to 3" fibers) (65 g), and $SiO_2$ natural sand (95 g), and a powdered brown colorant (5 g) were serially placed in a 12"×12"×1½" mold, the contents of the mold mixed, the mold was closed and clamped to withstand a pressure build-up, and the mixture allowed to polymerize under ambient conditions. Within about 15 minutes the temperature rose to about 120° F., and produced an internal pressure of about 1800 psi. Upon removal from the mold, the structural material exhibited strength comparable to wood, was waterproof, and could be nailed, sawed, screwed, and sanded. The resulting structural material was suitable for use as a wall panel.

Example 4

Methylene bis(phenylisocyanate) or MDI (46 g), polymethylene polyphenylisocyanate (with mixed isomers) (55 g), a high density polyol containing about 0.5 to 1 wt. % of a tertiary amine catalyst selected from the group consisting trimethylhexamethylenediamine, tetramethylbutanediamine, and 2-hydroxypropylethylene-diamine (110 g), soy oil (5 g), fiber glass (mixed strands of ½" to 1") (20 g), and carbon fibers (10 g) were serially placed in a 2"×4"×8" mold, the contents of the mold mixed, the mold was closed and clamped to withstand a pressure build-up, and the mixture allowed to polymerize under ambient conditions. Within about 15 minutes the temperature rose to about 122° F., and produced an internal pressure of about 1200 psi. Upon removal from the mold, the structural material exhibited strength comparable to wood, was waterproof, and could be nailed, sawed, screwed, and sanded. The resulting structural material was suitable for use as a structural framing material.

Example 5

Polymethylene polyphenyl isocyanate (60.5 g), butyl benzyl phthalate (49.5 g), a polyester polyol (110 g), dibutyltin dilaurate (0.4 g), soy oil (10 g), fiber glass (1" to 3" fibers) (15 g), and a powdered brown oil-based colorant (5 g) were serially placed in a 1"×4"×6" mold, the contents of the mold mixed, the mold was closed and clamped to withstand a pressure build-up, and the mixture allowed to polymerize under ambient conditions. Within about 15 minutes the temperature rose to about 122° F., and produced an internal pressure of about 1800 psi. Upon removal from the mold, the structural material exhibited strength comparable to wood, was waterproof, and could be nailed, sawed, screwed, and sanded. The resulting structural material was suitable for use as fencing and deco trim.

The table below provides several materials which can be utilized to prepare polymerizable formulations and practice the process described for forming a structural material. This is not a complete or exhaustive list of raw materials, but it simply provided to assist one skilled in the art to locate suitable materials. Alternative suitable raw materials are available and will be known by a skilled artisan. No limitations are intended by providing this listing of source materials.

4,4'-(1-Methylethylidene)bisphenol polymer with (chloromethyl)oxirane . . . ARALDITE® DBF CH . . . Huntsman Advanced Materials
Polyether Polyol . . . Hyperlite® DBF CH . . . Bayer Material Science LLC 4,4'-Isopropylidenediphenol . . . Sigma Aldrich
MDI/polmethylene polyphenyl isocyanate mixture . . . STEPANFOAM AC-555-T . . . Stepan Company
trimethylhexamethylenediamine/4,4'-isopropylidenediphenol . . . ARADUR® HY 2966 . . . Huntsman Advanced Materials
Polyol Blend . . . STEPANFOAM AC-555-R . . . Stepan Company
Polymethylene polyphenylisocyanate (Polymeric MDI)/ Butylbenzyl phthalate/dibutyltin dilaurate . . . PolyFoam F-3 Flexible Casting Foam Part B and PolyFoam F-5 Flexible Casting Foam Part B
Polyol Resin System . . . NCFI 22-13 R or B . . . NCFI Polyurethanes
Polyester Polyol/ Diethylene glycol . . . STEPANPOL PS-250A . . . Stepan Company The present invention contemplates modifications as would occur to those skilled in the art. While the disclosure has been illustrated and described in detail in the figures and foregoing description, the same is to be considered as illustrative and not restrictive in character, it being understood that only selected embodiments have been shown and described and that all changes, modifications and equivalents that come within the spirit of the disclosures described heretofore and/or defined by the following claims are desired to be protected.

The invention claimed is:

1. A polymerizable formulation comprising at least one isocyanate, at least one polyol, a catalyst and at least one filler contained in a mold having a pressure rating of at least 600 psi, wherein, under ambient conditions, the formulation has a pot life of from about 2 to about 10 minutes and under ambient conditions fully polymerizes in an exothermic and substantially adiabatic manner within about 5 to about 30 minutes.

2. The polymerizable formulation of claim 1, wherein the at least one isocyanate is selected from the group consisting of polymethylene polyphenylisocyanate, diphenylmethane diisocyanate, triphenylmethane triisocyanate, toluene diisocyanate and methyl diisocyanate, and combinations thereof.

3. The polymerizable formulation of claim 2, further comprising a vegetable oil.

4. The polymerizable formulation of claim 3, further comprising an additive selected from the group consisting of a polyphenol, a haloalkyl oxirane, an antioxidant, a flame retardant, a surfactant, a colorant, an ester, an elastomer, a blowing agent, and combinations thereof.

5. The polymerizable formulation of claim 3, wherein the catalyst is a tertiary amine.

6. The polymerizable formulation of claim 3, wherein the catalyst is selected from the group consisting of a dialkyltin derivative, tributyl bismuth, and combinations thereof.

7. The polymerizable formulation of claim 3, wherein the filler is selected from the group consisting of glass fibers, carbon fibers, plant fibers, carbon particles, polyolefin fibers, polyamide fibers, aramid fibers, and sand.

8. The polymerizable formulation of claim 3, wherein the formulation provides a pot life of about 3 to 8 minutes.

9. The polymerizable formulation of claim 3, including polymethylene polyphenyl isocyanate, diphenylmethane diisocyanate (MDI), a polyester polyol, diethylene glycol, dibutyltin dilaurate, soy oil, and fiber glass.

10. The polymerizable formulation of claim 3, including polymethylene polyphenyl isocyanate, diphenylmethane diisocyanate (MDI), a polyester polyol, a dialkytin derivative, a tertiary amine, corn oil, fiber glass and sand.

11. The polymerizable formulation of claim 3, including methylene bis(phenylisocyanate) (MDI), a polyol resin, a tertiary amine, an alkyl phthalate, fiber glass, sand, and a colorant.

12. The polymerizable formulation of claim 3, including methylene bis(phenylisocyanate) (MDI), polymethylene polyphenyl isocyanate, a polyol blend, a tertiary amine, soy oil, fiber glass and powdered carbon.

13. The polymerizable formulation of claim 3, including polymethylene polyphenyl isocyanate, butyl benzyl phthalate, a polyether polyol, dibutyltin dilaurate, soy oil, fiber glass, and a colorant.

14. A polymerizable admixture comprising at least one isocyanate, at least one polyol, and a catalyst contained in a mold having a pressure rating of at least 600 psi, wherein, under ambient conditions, the admixture has a pot life of from about 2 to about 10 minutes and under ambient conditions fully polymerizes in an exothermic and substantially adiabatic manner within about 5 to about 30 minutes.

15. A polymerizable admixture comprising at least one isocyanate, at least one polyol, a catalyst and at least one filler contained in a mold, wherein, under ambient conditions, the admixture has a pot life of under 15 minutes and under ambient conditions fully polymerizes in an exothermic and substantially adiabatic manner within 30 minutes while producing a pressure within the mold in the range of from 600 to 3,000 psi.

16. The polymerizable admixture of claim 15, wherein the admixture has, under ambient conditions, a pot life of under 10 minutes.

17. The polymerizable admixture of claim 15, wherein the admixture has, under ambient conditions, a pot life of under 8 minutes.

18. The polymerizable admixture of claim 15, wherein under ambient conditions, the admixture fully polymerizes in an exothermic and substantially adiabatic manner within 5 minutes.

19. The polymerizable admixture of claim 15, wherein under ambient conditions, the admixture fully polymerizes in an exothermic and substantially adiabatic manner while producing a pressure within the mold in the range of from 800 to 2,200 psi.

\* \* \* \* \*